(12) United States Patent
Fournier

(10) Patent No.: US 7,431,370 B2
(45) Date of Patent: Oct. 7, 2008

(54) SEATING ACCESSORY

(75) Inventor: Joseph R. Fournier, Clinton Township, MI (US)

(73) Assignee: Tale-Gator Distributors, LLC, Troy, MI (US)

( * ) Notice: Subject to any disclaimer, the term of this patent is extended or adjusted under 35 U.S.C. 154(b) by 0 days.

(21) Appl. No.: 11/732,640

(22) Filed: Apr. 4, 2007

(65) Prior Publication Data
US 2007/0182193 A1 Aug. 9, 2007

Related U.S. Application Data

(62) Division of application No. 11/273,142, filed on Nov. 14, 2005, now Pat. No. 7,201,424.

(51) Int. Cl.
*B60N 2/00* (2006.01)
(52) U.S. Cl. ........................................ 296/64; 296/57.1
(58) Field of Classification Search .................. 296/64, 296/57.1, 65.05; 297/344.18, 170, 153
See application file for complete search history.

(56) References Cited

U.S. PATENT DOCUMENTS

| | | | | |
|---|---|---|---|---|
| 2,702,076 A | * | 2/1955 | Beardsley et al. | ............ 297/252 |
| 5,000,504 A | * | 3/1991 | Munguia | .................... 296/57.1 |
| 5,215,346 A | * | 6/1993 | Reitzloff et al. | ........... 296/65.09 |
| 5,462,334 A | * | 10/1995 | Sedorcek et al. | ............. 297/252 |
| 5,971,464 A | * | 10/1999 | Davis et al. | ................. 296/57.1 |
| 5,975,610 A | * | 11/1999 | Tracy | ......................... 296/57.1 |
| 6,116,676 A | * | 9/2000 | Edwards | ....................... 296/64 |
| 6,273,504 B1 | * | 8/2001 | Pace et al. | ................ 297/219.1 |
| 6,286,885 B1 | * | 9/2001 | Ramos | .......................... 296/64 |
| 6,364,391 B1 | * | 4/2002 | Everett | ....................... 296/57.1 |
| 6,588,822 B1 | * | 7/2003 | Duvall, Jr. | .................. 296/57.1 |
| D479,499 S | | 9/2003 | Cameron | ................... D12/221 |
| 6,824,186 B2 | * | 11/2004 | Brown | ...................... 296/65.01 |
| 2002/0109369 A1 | * | 8/2002 | Boomhower et al. | ........ 296/57.1 |

* cited by examiner

*Primary Examiner*—Kiran B. Patel
(74) *Attorney, Agent, or Firm*—Young Basile

(57) ABSTRACT

A seating accessory for use in combination with the inside surface of the tailgate of a pickup truck. The accessory includes a generally rectangular sheet sized to be positioned over the lowered tailgate surface and defining two side-by-side upwardly opening concave seating surfaces to accommodate side-by-side seated persons. A backrest is associated with each seating surface and is pivotally moveable between an upright position providing back support for a person sitting on the respective seating surface, and a lowered, stowed position within the concavity of the respective seating surface. The seating access is secured to the tailgate using suitable fasteners coacting with the tailgate.

8 Claims, 5 Drawing Sheets

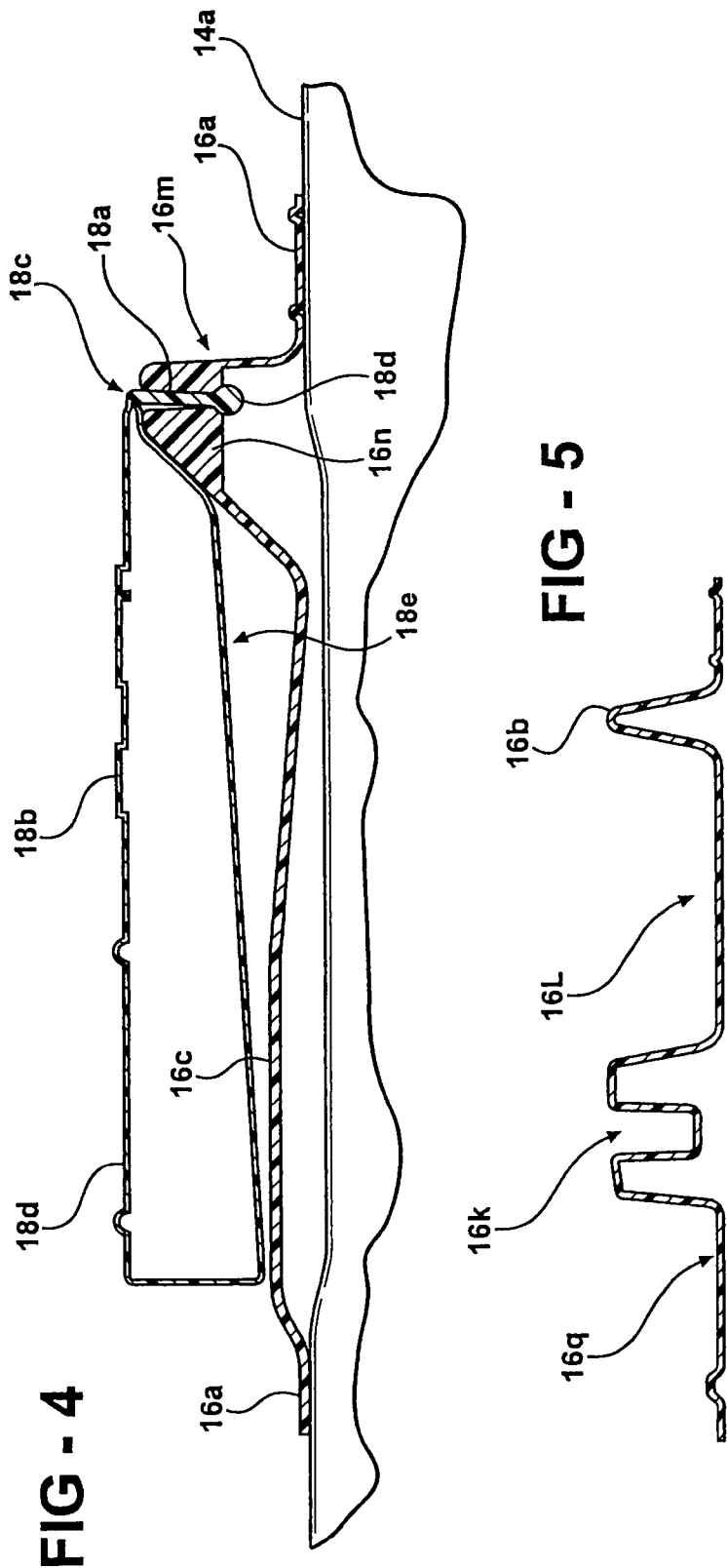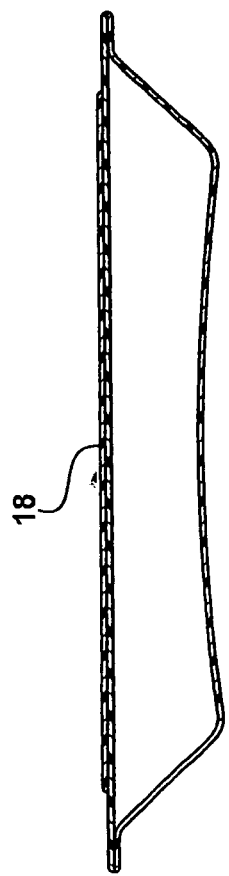

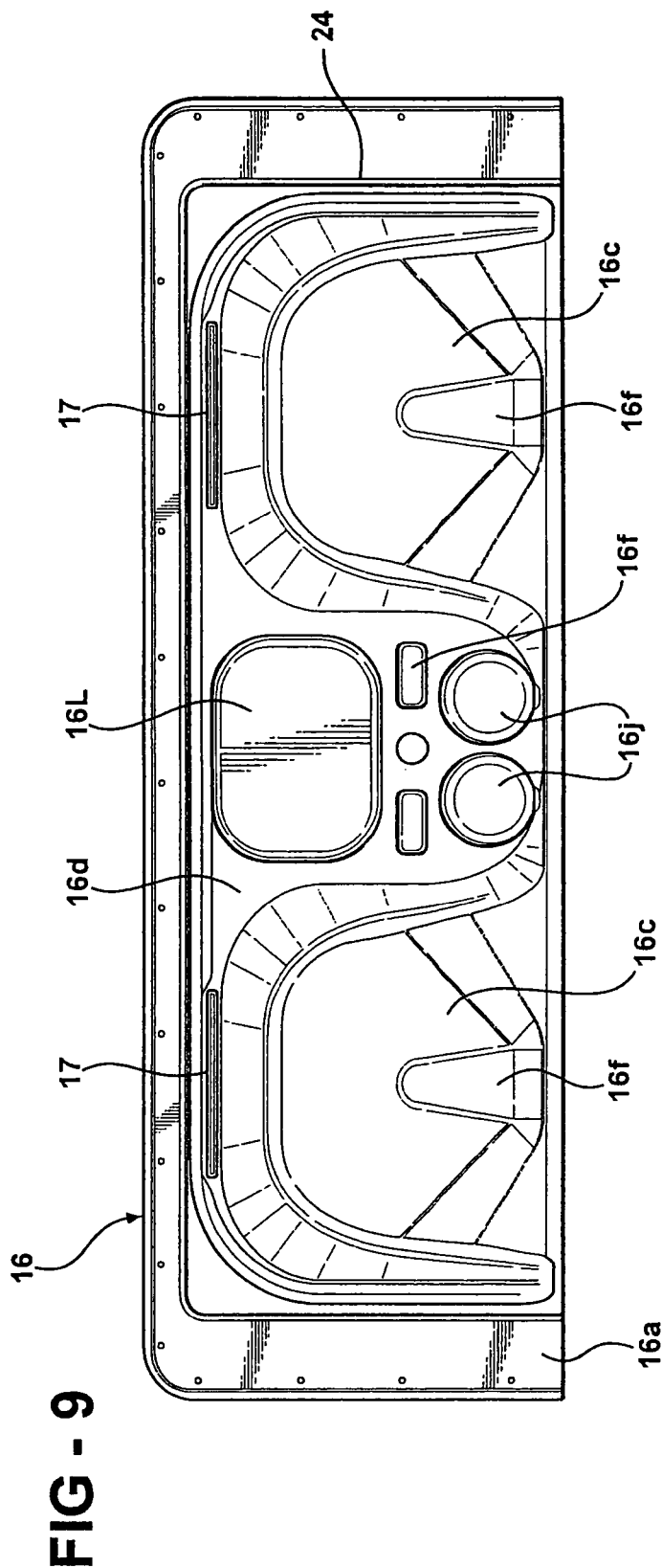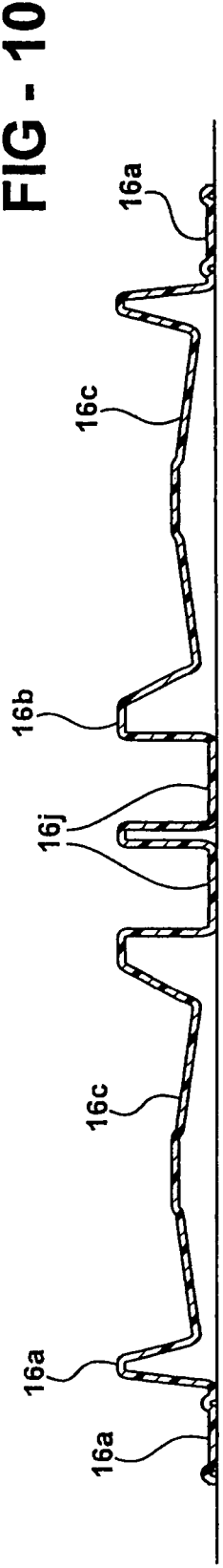

SEATING ACCESSORY

RELATED APPLICATION

This application is a divisional of U.S. application Ser. No. 11/273 142 filed on Nov. 14, 2005 now U.S. Pat. No. 7,201,424. The content of the U.S. Pat. Ser. No. 11/273,142 is incorporated herein by reference.

FIELD OF THE INVENTION

This invention relates to motor vehicle accessories and more particularly to a seating accessory which may be used in association with a horizontal support surface of a motor vehicle, such as a lowered tailgate, to provide comfortable outdoor seating.

This invention relates to motor vehicle accessories and more particularly to a seating accessory which may be used in association with a horizontal support surface of a motor vehicle, such as a lowered tailgate, to provide comfortable outdoor seating.

BACKGROUND OF THE INVENTION

It is common practice at outdoor activities, such as sporting events, to lower the tailgate of a truck to provide a horizontal support surface for dining, seating, game playing or the like. However, for purposes of seating, the surface of a lowered tailgate is not comfortable, especially for extended periods of usage.

SUMMARY OF THE INVENTION

This invention relates to a seating accessory for motor vehicles.

More particularly, this invention relates to a seating accessory for use in association with a horizontal support surface of a motor vehicle, such as the inside of a lowered tailgate, to provide comfortable seating. According to the invention, the accessory is made of sheet material such as plastic to define a base, a raised deck and, within the deck, at least one recess defining an upwardly-opening, concave seating surface configured to accommodate a human posterior and, optionally, one or more other recesses to receive, for example, drink containers. The base area around the seating surface or surfaces is grounded to the support surface, but the seating surface or surfaces are not grounded to the support surface, but lie above the plane of the supporting surface to lend resilience to the seating surface or surfaces when under load.

In the preferred embodiment of the invention, the base member defines two side-by-side, upwardly-opening seating surfaces formed in a raised deck to accommodate two side-by-side seated persons, and additional recesses defining drink holders and the like between the seating surfaces.

Also, in the preferred embodiment, the base member is separate from the support surface and is attached thereto by screws or plastic "clips." However, the base may be original equipment to, for example, a pickup truck and may be made of metal as well as plastic.

According to an optional feature of the invention, backrests are provided for the seating surfaces. The backrests may be made, for example, of plastic and are sized and shaped to conform generally to the seating surface recesses so that the backrests may be stowed in and over the seating recesses when not in use.

In the preferred form, the backrests include a main body defining the backrest surface and an integral connector tab, and the base member further defines a slot or socket proximate the rear of the seating surface to receive the connector tab. The tab is joined to the backrest body in such a way as to form a living hinge which allows each backrest to be raised for use and lowered for storage.

According to a further optional feature, the backrests include flexible straps extending from each backrest to the base member and operative to support the backrest in its raised position. The straps may, for example, be made of Nylon webbing.

In the specific and illustrative embodiment hereinafter described, the seating accessory is used with the tailgate of a pickup truck, the inboard wall of the tailgate defining the generally flat support surface, and the base member being positioned in overlying, covering relation to the inboard wall of the lowered tailgate.

The invention also provides a methodology for providing a seating surface on a vehicular support surface.

According to the invention methodology, a cover sheet is provided substantially conforming in size and shape to the vehicular support surface; the sheet is shaped to provide an upwardly-opening, concave seating surface configured to accommodate a human posterior; and the sheet is removably attached to the vehicular support surface.

According to a further feature of the invention methodology, the vehicular support surface is defined by the inboard wall of a tailgate of a pickup truck with the tailgate in a lowered position.

According to a further feature of the invention methodology, the cover sheet is provided in a size providing excess area adjacent the seating surface and the excess area is selectively cut away to conform the cover sheet to various tailgate sizes corresponding to various sizes of pickup trucks.

According to a further feature of the invention methodology, a backrest member is provided defining a backrest surface and the backrest member is pivotally mounted on the cover sheet for movement between an upstanding operative position providing back support for a person positioned on the seating surface and a lowered, stowed position in overlying relation to the seating surface.

According to a further feature of the invention methodology, the cover sheet is shaped to provide side-by-side seating surfaces, each configured to accommodate a human buttock.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIGS. 4 and 5 are cross-sectional views taken on lines 4-4 and 5-5 of FIG. 3;

FIG. 6 is a cross-sectional view taken on line 6-6 of FIG. 7.

FIG. 9 is a plan view showing the manner in which the seating accessory of the invention may readily accommodate the tailgates of various size trucks; and FIG. 10 is a cross-sectional view taken on line 10-10 of FIG. 3.

DETAILED DESCRIPTION OF THE PREFERRED EMBODIMENT

Figure 1:
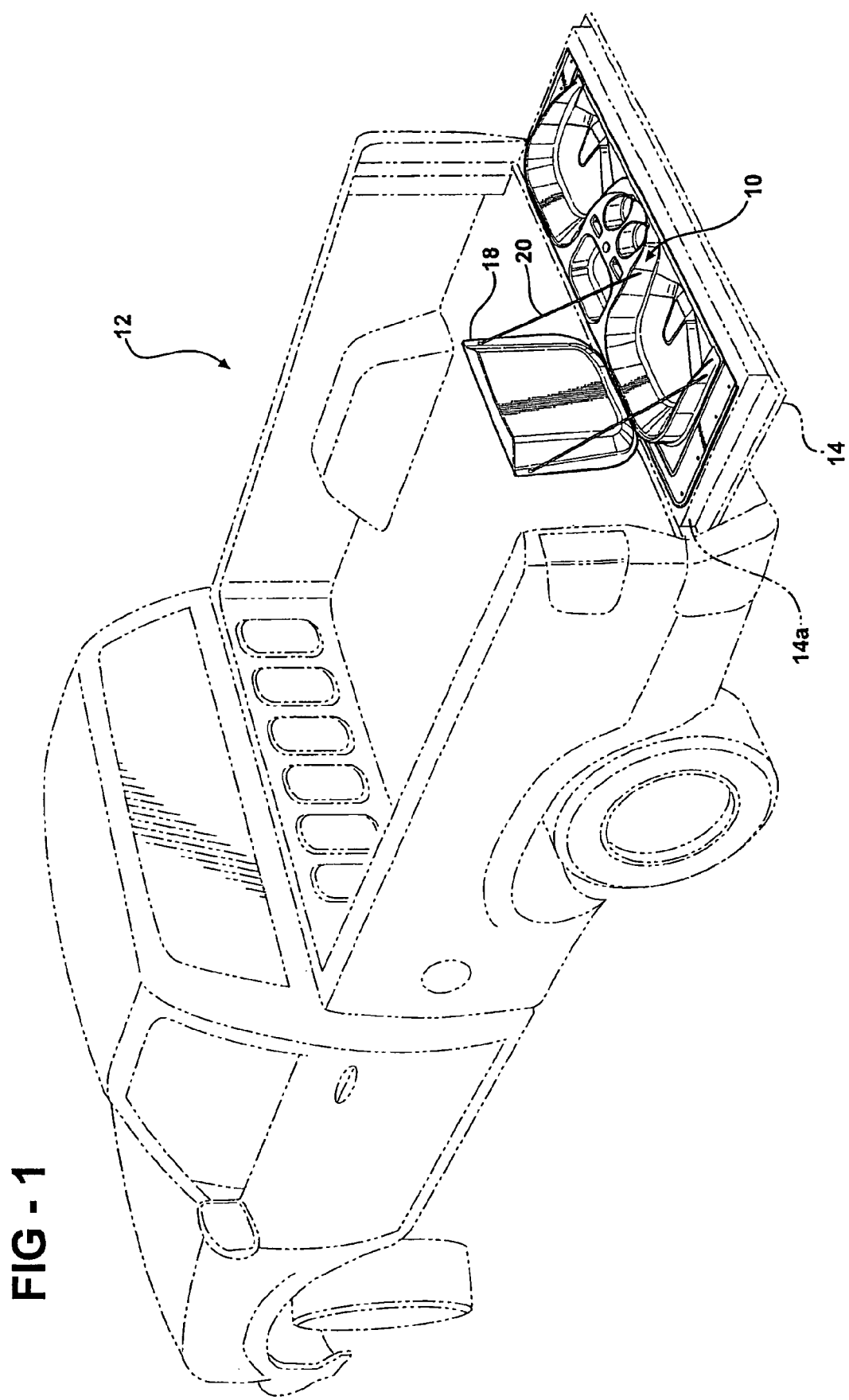
FIG. 1 is a perspective view of a truck, showing a seating accessory embodying the invention installed on the inside surface of a lowered tailgate.
Figure 2:
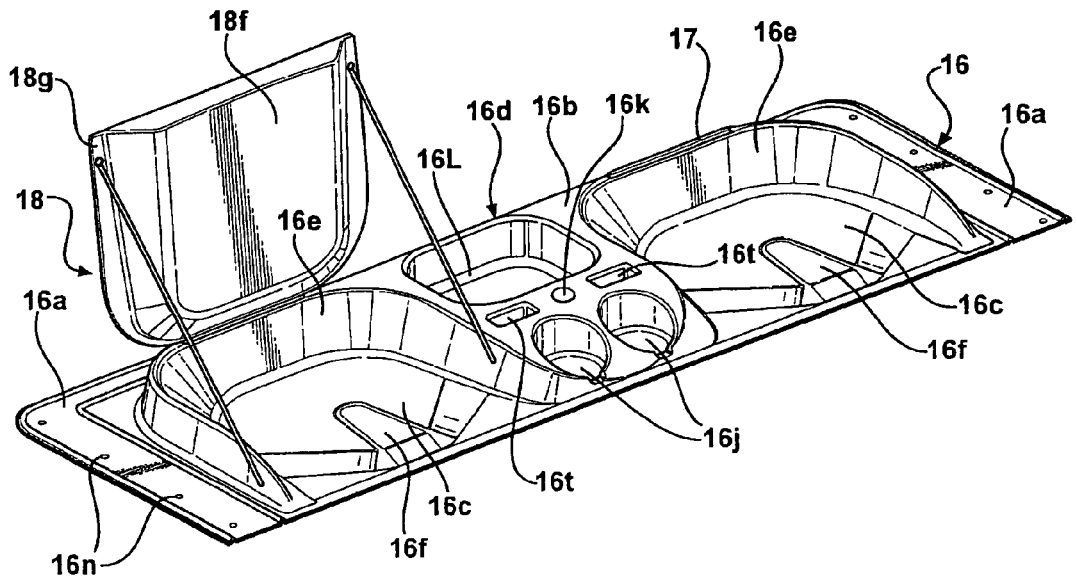
FIG. 2 is a perspective view of the seating accessory.
Figure 3:
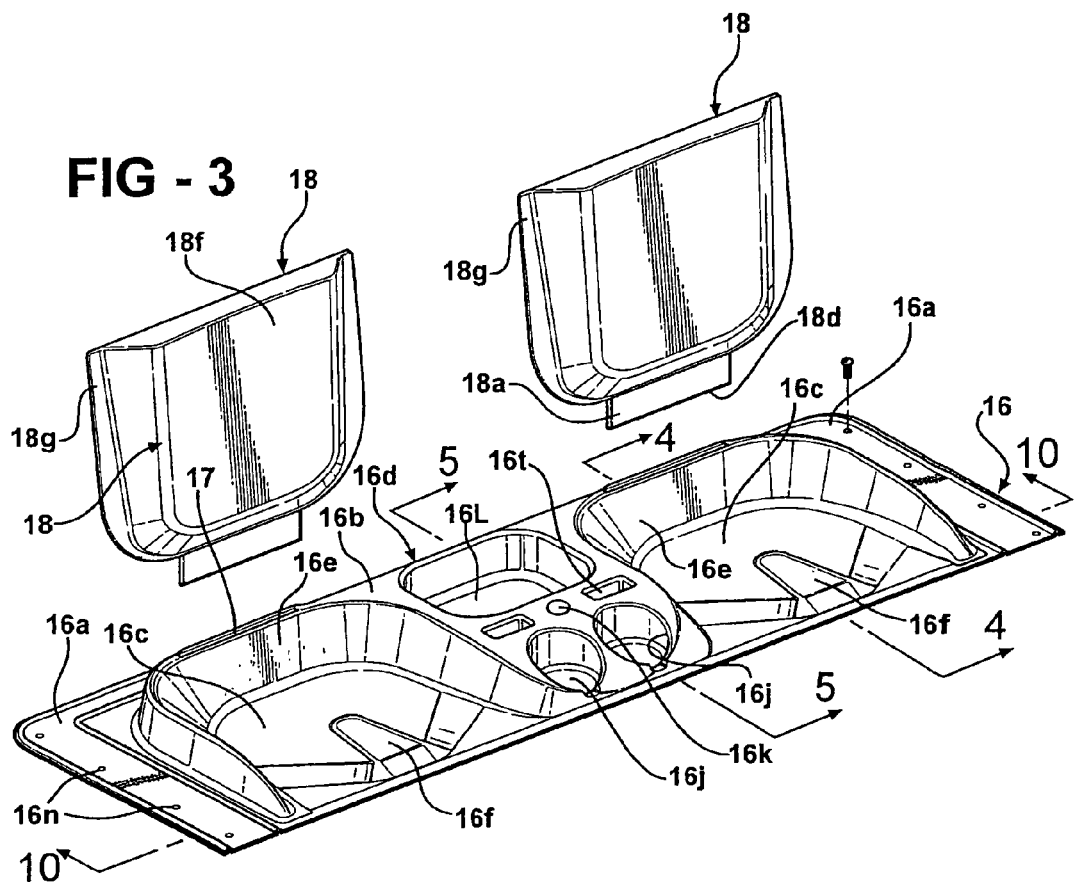
FIG. 3 is a perspective exploded view of the seating accessory of FIG. 1.

FIG. 1 shows a seating accessory 10 installed on the inside surface of a tailgate 14 hingedly installed on a truck 12. The inside surface 14a of the tailgate 14 is the support surface for the accessory 10.

The seating accessory 10, broadly considered, includes a rectangular plastic base member 16 and a pair of hinged backrests 18.

Base member 16 is formed as a molded sheet of plastic material having a generally rectangular configuration. Base member 16 may be formed, for example, of a polypropylene UV stabilized material and may be formed in an injection molding operation. Plastic is mentioned by way of example, i.e., the base member may alternatively be made of metal such as aluminum or steel.

Base member 16 defines a flat planar base 16a which, when the accessory is installed, is grounded on the support surface 14a. The base member defines a raised deck 16b and, within the deck portion, a pair of spaced-apart recesses 16c defining seating surfaces sized and shaped to receive a human posterior. The bottoms of the seating surfaces 16c lie above the plane of the base 16a and, therefore, are not grounded to the support surface 14a but lie above it to provide resilience for comfort and to provide a cushioning effect. A central convenience section 16d is positioned between the seating surfaces 16c and includes additional recesses of varying shapes as hereinafter described to accommodate drinks, ice, cigarette packs and other items. The recesses of the convenience section are preferably grounded, i.e., the bottoms lie against surface 14a. Each seating surface 16c is defined as an upwardly-opening, concave area configured to accommodate a human posterior. Surrounding the seating surfaces 16c are U-shaped surrounds 16e which join the seating surfaces 16c to the deck 16b. The surrounds 16e blend into the convenience section 16d at the front of the base member 16 as shown.

The seating surfaces 16c are contoured to receive and conform generally to a human posterior. In the front center of each surface 16c is a raised wedge-shaped portion 16f which lies between the contact points of a human posterior with the surface 16c to provide a feeling to the user similar to that of a motorcycle seat. The front edges of the surfaces 16c are grounded, as are the outsides of the surrounds 16e. However, the majority of the seating surfaces 16c lie above the ground plane as shown in FIG. 4 to provide flexing under load.

Central convenience section 16d defines a pair of cupholders 16j, an umbrella holder 16k, an all purpose tray 16l, and cigarette pack holders 16t.

Each surround 16e has formed in the rear portion thereof a laterally extending slot or socket 17 to receive a backrest 18 as hereinafter described.

A backrest member 18 is provided in association with each seating surface 16c. Each backrest member 18 is pivotally mounted on the base member 16 for movement between an upright operative position in which it defines a backrest surface to support the back of a person positioned on a seating surface 16c, and a stowed position in which is overlies the seating surface. In the stowed position, the backrest 18 is positioned in the concavity defining a seating surface 16c.

Figure 7:
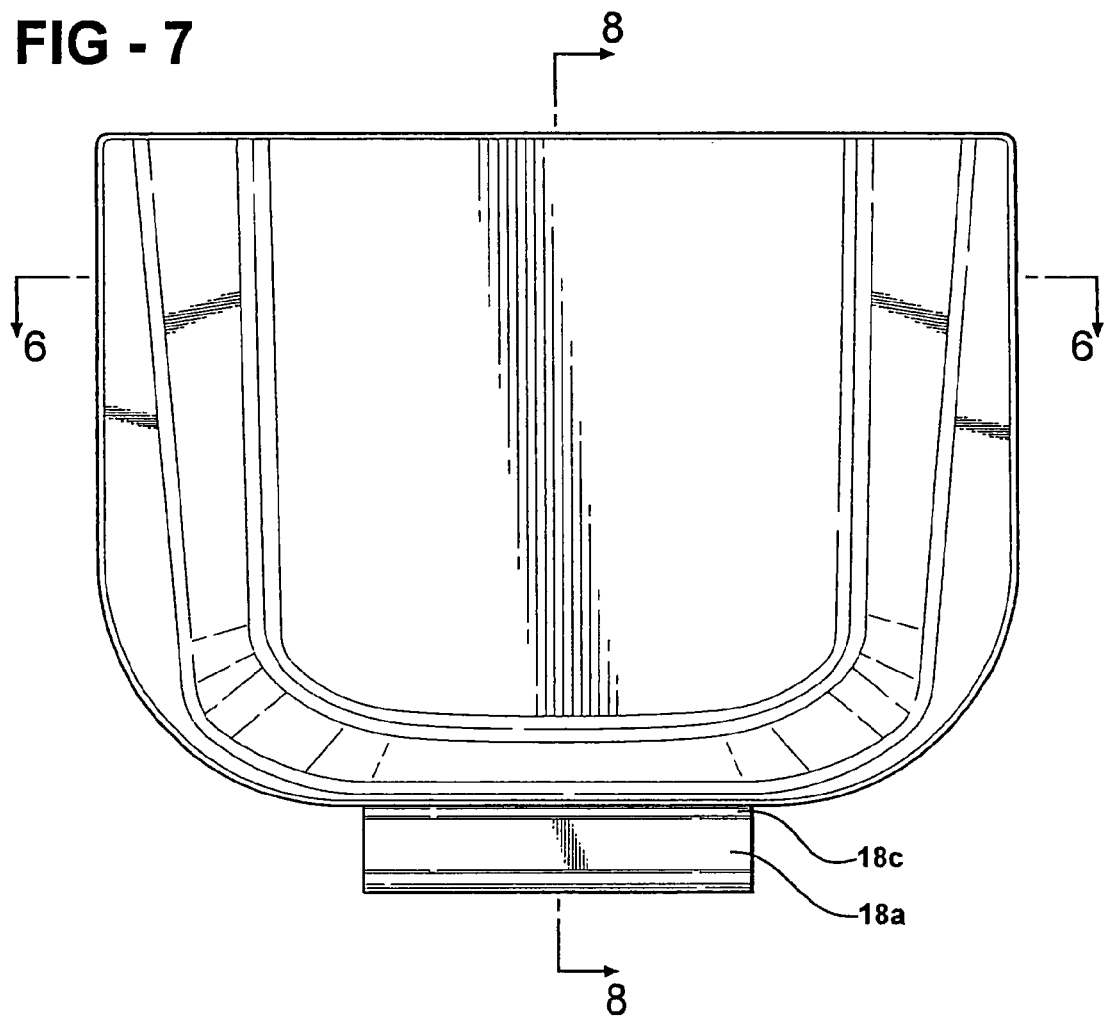
FIG. 7 is a top view of a backrest employed in the invention seating accessory.
Figure 8:
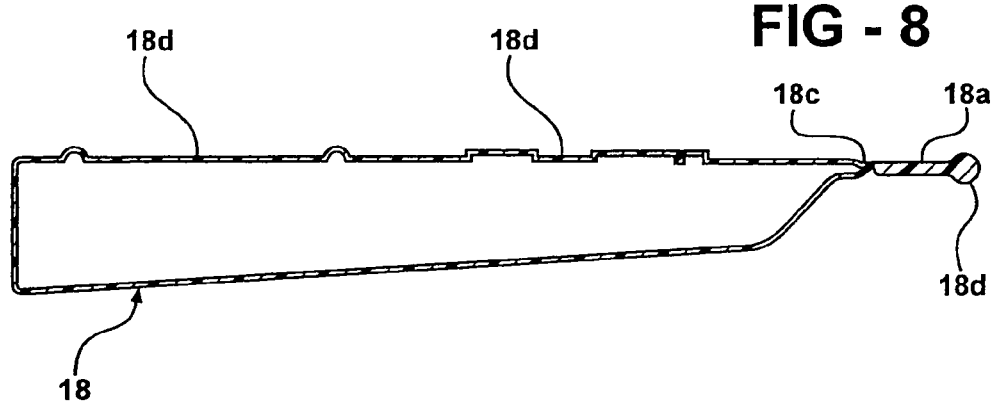
FIG. 8 is a cross-sectional view taken on line 8-8 of FIG. 7.

A pivotal connection of each backrest member 18 to the base member 16 is provided by a tab 18a connected to a rear edge of the main body 18b of the backrest via a living hinge 18c (see FIG. 7). Tab 18a is sized to fit into a respective slot 17 with a snap fit employing a bulbous end edge 18d contacting with integral ribs 16n (FIG. 4). The tab may be easily inserted, will stay in place so long as a backrest support is desired, and may be readily removed to separate the backrest 18 from the base member 16.

Backrest main body 18b is preferably formed of a polypropylene plastic material in a blow molding operation using a suitable parison or may be formed of EPP foam. The main body 18b of each backrest includes a generally planar back portion 18d and a cushion portion 18e. The cushion portion 18e is configured to be positioned within the concavity of the base member defining the respective seating surface 16c with the rear central portion 18f of the cushion portion 18e suitably bowed to accommodate the raised central plateau portion 16f of the seating surface. The cushion portion 18e will be seen to be inset with respect to back portion 18d along the side and front edges of the backrest to define a peripheral flange 18g which may seat along the upper edges of the respective seating surface 16b with the cushion portion 18de positioned in the concavity of the seating surface.

The movement of each backrest between its upright operative position and its stowed position proximate the base member 16 is provided by the living hinge 18c in coaction with the tab 18a received in the slot or socket 17. In the upright position, each backrest is further supported by a pair of flexible straps 20 extending from the backrest to the base member. The straps may be made of Nylon webbing and are connected to the accessory structure by rivets or snaps or the like.

The seating accessory 10 is secured to the support surface 14b of the lowered tailgate 14 utilizing fasteners 22 extending through suitable apertures 16n provided in main body portion 16a for engagement with suitable apertures in the tailgate surface 14. The apertures in the tailgate surface 14 may be preexisting or may be formed in the surface 14a in a drilling operation.

Fasteners 22 may, for example, comprise "Christmas tree" type fasteners extending, as seen in FIG. 10, through respective apertures 16n in the planar portion 16a of the base member for engagement with suitable apertures in the tailgate.

According to an invention methodology, and as best seen in FIG. 9, the plastic cover sheet forming the base member 16 may be provided in a size providing excess planar area 16a adjacent the seating surfaces 16c whereby the excess area may be selectively cut away to conform the cover sheet to various tailgate sizes corresponding to various sizes of trucks. Specifically, with the continued reference to FIG. 9, sheet 16 may retain the illustrated, full size solid line configuration to accommodate the tailgate of a full size pickup truck or may be cut along the line 24 to accommodate the tailgate of a mid size pickup truck.

The invention seating accessory will be seen to provide many important advantages. Specifically, the invention accessory device provides a means of providing ready, comfortable seating in an outdoor environment utilizing the horizontal support surface provided by the lowered tailgate of a truck; the seating accessory may be readily attached to the tailgate; and the accessory, by virtue of its light weight and compact size, may be readily stowed when not in use. As indicated above, the accessory may be an aftermarket item added to a pre-existing tailgate. Alternatively, it may be integrated into the tailgate by the vehicle manufacturer as original equipment.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

The invention claimed is:

1. A method of providing seating on the inside surface of a vehicle tailgate or the like wherein the method comprises:
   shaping a base sheet of material to provide an upwardly opening, concave seating surface configured to accommodate a human posterior as well as support surfaces around and laterally of the seating surface which, when mounted on the inside surface of a tailgate, contact the tailgate surface and hold the seating surface substantially above and in spaced relation to the tailgate surface; and
   attaching the base sheet to the inside surface of a vehicle tailgate.

2. A method according to claim 1, wherein:
   the tailgate comprises the tailgate of a pickup truck;
   the base sheet is provided in a size providing excess area adjacent the seating surface; and
   the excess area is selectively cut away to conform the base sheet to various tailgate sizes corresponding to various sizes of pickup trucks.

3. A method according to claim 1 wherein the base sheet is shaped to provide side-by-side seating surfaces, each configured to accommodate a human buttock.

4. A method according to claim 2 wherein:
   a backrest member is provided defining a backrest surface; and
   the backrest is pivotally mounted on the base sheet for defining an upstanding operative position providing back support for a person positioned on the seating surface and a lowered, stowed position in overlying relation to the seating surface.

5. A method according to claim 1 wherein the base sheet is formed of a single sheet of molded plastic material.

6. A method according to claim 5 wherein the base sheet is formed in an injection molded process.

7. A seating structure adapted to be associated with an underlying support surface to provide individual, human-contoured seating surface, comprising a sheet of flexible material having a rear edge and a front edge lying on said support surface and a contoured receiving area between the front and rear edges, defining and configured to accommodate a human posterior, and spaced substantially in its entirety above the support surface to permit flexing of the sheet material in the space between the seating surface and the support surface.

8. A seating structure according to claim 7 wherein the seating surface includes side edge surfaces and the side edge surfaces are disposed in contact with the support surface.

* * * * *